United States Patent [19]

Chen et al.

[11] Patent Number: 5,715,187
[45] Date of Patent: Feb. 3, 1998

[54] METHOD AND APPARATUS FOR INTEGER MULTIPLICATION

[75] Inventors: Jason Chen, Taiwan; Paul Chen; George Chang, both of Taichung, all of Taiwan

[73] Assignee: Holtek Microelectronics, Inc., Hsinchu, Taiwan

[21] Appl. No.: 610,410

[22] Filed: Mar. 4, 1996

[51] Int. Cl.$^6$ .................................................. G06F 7/52
[52] U.S. Cl. ....................................... 364/754; 364/757
[58] Field of Search ................................. 364/718, 721, 364/754, 757, 758, 760

[56] References Cited

U.S. PATENT DOCUMENTS

| | | | |
|---|---|---|---|
| 4,190,894 | 2/1980 | Mudge | 364/758 |
| 4,566,075 | 1/1986 | Guttage | 364/754 |
| 5,117,385 | 5/1992 | Gee | 364/757 |
| 5,255,216 | 10/1993 | Blanz et al. | 364/757 |

*Primary Examiner*—Chuong D. Ngo
*Attorney, Agent, or Firm*—Barnes, Kisselle, Raisch, Choate, Whittemore & Hulbert, P.C.

[57] ABSTRACT

A binary multiplication method utilizing a combined table lookup and long multiplication to simplify the multiplication procedure, to improve the computational speed, and to save half of the memory space normally required. The method is executed by first moving the least significant bit (LSB) of the multiplier to another memory device before the start of the computation and then using the shortened multiplier in the multiplication operation since the multiplier is reduced by one bit, the memory space required for the multiplication table is reduced by half. The method does not require the use of a multiplying device and only needs small memory space. The manufacturing cost of a microprocessor can be reduced accordingly.

14 Claims, 3 Drawing Sheets

INDEXED PRODUCT TABLE

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 2 | 4 | 6 | 8 | A | C | E | 10 | 12 | 14 | 16 | 18 | 1A | 1C | 1E |
| 2 | 0 | 4 | 8 | C | 10 | 14 | 18 | 1C | 20 | 24 | 28 | 2C | 30 | 34 | 38 | 3C |
| 3 | 0 | 6 | C | 12 | 18 | 1E | 24 | 2A | 30 | 36 | 3C | 42 | 48 | 4E | 54 | 5A |
| 4 | 0 | 8 | 10 | 18 | 20 | 28 | 30 | 38 | 40 | 48 | 50 | 58 | 60 | 68 | 70 | 78 |
| 5 | 0 | A | 14 | 1E | 28 | 32 | 3C | 46 | 50 | 5A | 64 | 6E | 78 | 82 | 8C | 96 |
| 6 | 0 | C | 18 | 24 | 30 | 3C | 48 | 54 | 60 | 6C | 78 | 84 | 90 | 9C | A8 | B4 |
| 7 | 0 | E | 1C | 2A | 38 | 46 | 54 | 62 | 70 | 7E | 8C | 9A | A8 | B6 | C4 | D2 |

50

METHOD AND APPARATUS FOR INTEGER MULTIPLICATION

FIELD OF THE INVENTION

The present invention generally relates to a memory space saving method and apparatus for integer multiplication and more particularly, relates to a memory space saving method and apparatus for integer multiplication by utilizing a combined table lookup and long multiplication method to simplify the multiplication procedure, to speed up the multiplication speed and to save half of the memory space required for the product table.

BACKGROUND OF THE INVENTION

In a conventional multiplication method executed by a microprocessor, the multiplication method can be carried out by a software only method, a hardware only method, or a software/hardware simultaneous processing method. In a conventional microprocessor that does not have hardware multiplication instructions, a multiplication is performed by either a long multiplication method or by a direct table lookup method. The long multiplication method employed is similar to that normally performed manually and therefore, it has the drawback of a slow computational speed. For instance, in the example of a binary multiplication method, a long multiplication method is carried out by the following steps.

$$\frac{\begin{array}{r}X_1\,X_0\\ *\,Y_1\,Y_0\end{array}}{}$$

$$\frac{\begin{array}{r}(X_1*Y_0)(X_0*Y_0)\\ (X_1*Y_1)(X_0*Y_1)\end{array}}{(X_1*Y_1)[(X_1*Y_0)+(X_0*Y_1)](X_0*Y_0)},$$

Wherein the bits of the multiplicand are $X_1$ and $X_0$ and the bits of the multiplier are $Y_1$ and $Y_0$. The first step of the calculation is $(X_1\,X_0 * Y_0)$. The second step of the calculation is $(X_1\,X_0 * Y_1)$. The final product is the sum of the above two partial products. When both bits are 1, the product is 1. When one of the bit is 0, the product is 0.

The procedure can be further illustrated by the binary multiplication method of (7*2) shown below:

$$\frac{\begin{array}{r}111\\ *\,10\end{array}}{0}$$

$$\frac{111}{1110}$$

Wherein the required number of the partial products equals to the number of bits of the multiplier. The values of the partial products need to be stored in a temporary memory device. FIG. 1 shows a computational flow chart for a conventional long multiplication method.

The advantage of a binary long multiplication method is that it can be expressed in a simple and clear manner. However, to implement the long multiplication method by a hardware, the circuit required is very complicated which leads to low operational efficiency. Moreover, when a large multiplier is used, its operational speed decreases significantly. For instance, in the calculation of two binary numbers, four partial products are required. In the calculation of two 4-bits numbers, then 16 partial products are necessary. It is therefore obvious that the binary long multiplication method can not be efficiently executed.

Drawbacks of the binary long multiplication method are the large memory space required, the long execution cycle time used, and the high manufacturing cost. Since the product of each digit in the multiplication of a multiplicand and a multiplier needs to be stored individually such that the final product can be calculated, very large memory space is required. Furthermore, since each bit of the multiplicand and the multiplier must be multiplied, the number of multiplication required is proportional to the number of bits of the multiplier. The larger the multiplier, the longer the execution cycle time. The large memory space occupied by the partial products and the complex execution procedures required also lead to the necessity of a high cost microprocessor.

In order to overcome the drawbacks and the shortcomings of the binary long multiplication method, others have attempted to simplify the computational procedure by using a table lookup method. A lookup table is a multiplication or product table constructed by using the multipliers and the multiplicands as the indices. The multiplication table can be stored in a read only memory (ROM) to facilitate its usage. The lookup table method, even though enables a quick result to be found, is only applicable for small multiplication tables. When large multiplication tables are involved, the method requires a large memory space and a long retrieval time.

It is therefore an object of the present invention to provide a method and apparatus for integer multiplication which does not have the drawbacks and shortcomings of the prior art methods.

It is another object of the present invention to provide a method and apparatus for integer multiplication by utilizing a combined table lookup and long multiplication method.

It is a further object of the present invention to provide a method and apparatus for integer multiplication which is capable of saving half of the memory space normally required for the multiplication/product table.

It is another further object of the present invention to provide a method and apparatus for integer multiplication that has improved computational speed.

It is yet another object of the present invention to provide a method and apparatus for integer multiplication by utilizing a table lookup method to simplify the computational procedure.

It is still another object of the present invention to provide a method and apparatus for integer multiplication by utilizing less memory space such that the cost of the microprocessor can be reduced.

SUMMARY OF THE INVENTION

In accordance with the present invention, a method and apparatus for integer multiplication that requires only half of the memory space normally required and that has improved computational speed is provided.

The present invention utilizes a binary long multiplication method as its operation architecture assisted by a table lookup method to simplify its procedure and save half of the memory space required for the multiplication table. The method is executed by first reading the values of the multiplier and the multiplicand before looking up the multiplication table, the least significant bit of the multiplier is first right-shifted to another memory. The table is then looked up using the multiplicand and the multiplier right-shifted as indices. The product obtained from looking up the table is first temporarily stored in a memory, it is then determined whether the lowest bit after the right-shifting is 1. If 1 is found, the multiplicand is added to the value of the product obtained from the lookup table to arrive at the final product value. If 0 is found, then the product from the multiplication table is the final value of the product.

In a preferred embodiment, the present invention method utilizes a combined table lookup and long multiplication to simplify the multiplication procedure, to improve the computational speed and to save half of the memory space normally required for a multiplication table. The method is executed by first moving the least significant bit (LSB) of the multiplier to another memory device before the start of the computation and then using the shortened multiplier in the multiplication operation. Since the multiplier is reduced by one bit, as shown in the implementation example, the memory space required for the multiplication table is reduced by half. The method does not require the use of a multiplying device or a large memory space. The manufacturing cost of a microprocessor can therefore be reduced.

The present invention is further directed to an apparatus for integer multiplication that only requires half of the memory space that is normally necessary. The apparatus enables the manufacturing of a low cost microprocessor.

BRIEF DESCRIPTION OF THE DRAWINGS

Other objects, features, and advantages of the present invention will become apparent upon consideration of the specification and the appended drawings, in which.

DETAILED DESCRIPTION OF THE PREFERRED EMBODIMENT

Figure 1:
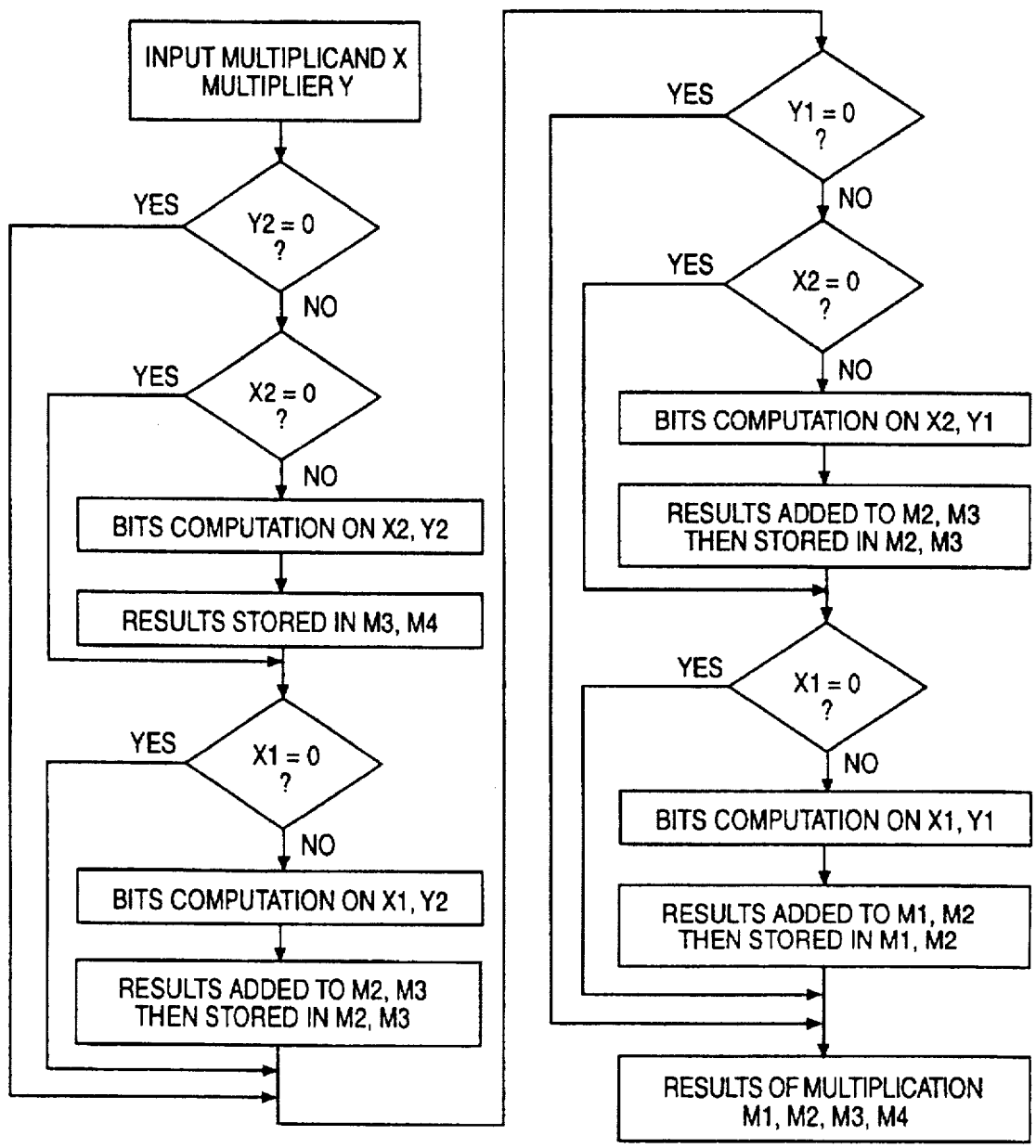
FIG. 1 is a computational flow chart for a prior art long multiplication method.
Figure 2:
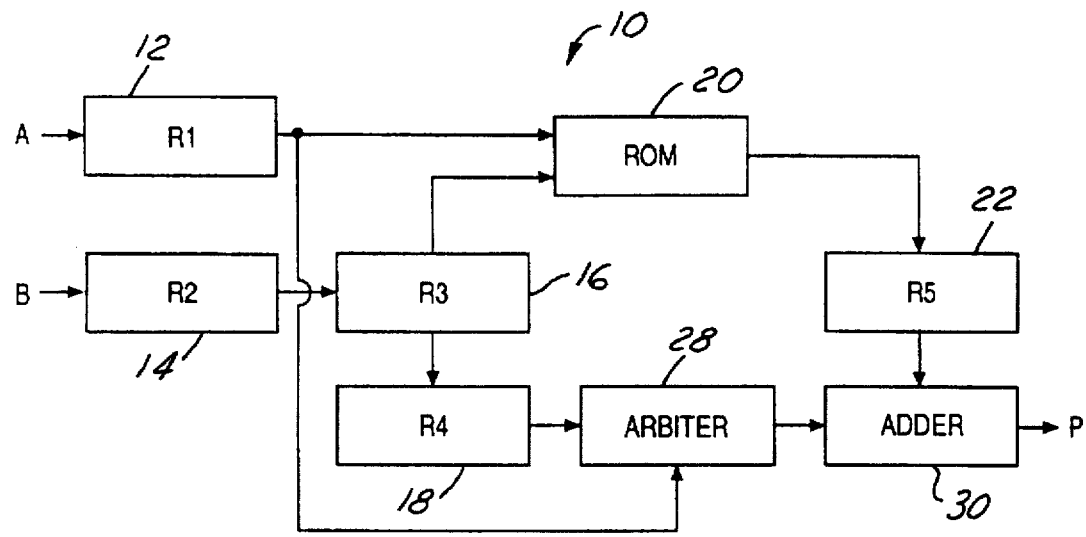
FIG. 2 is a functional block diagram for the present invention method.

Referring initially to FIG. 2, where it is shown a functional block diagram of the present invention multiplication method. The microprocessor 10 utilized in the present invention apparatus includes at least a first storage device 12 for storing the multiplicand A, a second storage device 14 for storing the multiplier B, a third storage device 16 for storing the multiplier that has been right-shifted, a fourth storage device 18 for storing the right-shifted least significant bit (LSB), a read-only memory (ROM) device 20 for storing the indexed multiplication table, a fifth storage device 22 for storing the value retrieved from the indexed multiplication table, an arbiter 28 for determining whether the value stored in the fourth storage device 18 is 1 or 0 (the multiplicand stored in the first storage device 12 is outputted if the value is 1 and a value of 0 is outputted if the value of the fourth storage device 18 is 0) and an adder 30 for adding the retrieved indexed product value and the output from the arbiter 28 together in order to obtain the product of the multiplicand A and the multiplier B.

Figures 4, 5:
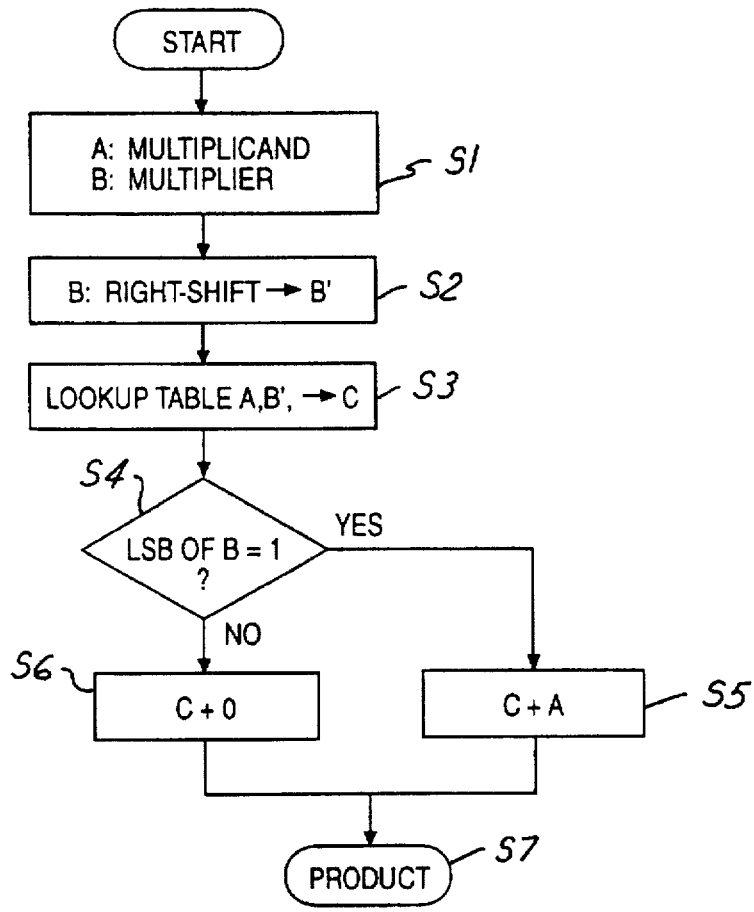
FIG. 4 is a present invention 4 bits * 4 bits multiplication table example with the value expressed in hexadecimal.
FIG. 5 is a computational flow chart of the present invention method.

Using the multiplication of 15*11 as an example, the binary expression for the multiplication is 1111*1011. The multiplier 1011 is right-shifted one bit to become 101, adding a 0 to the leftmost position to become 0101. When looking-up the table, the retrieval index used is 1111*0101. As shown in FIG. 4, the lookup value for 15*5 is 96 (expressed in hexadecimal units) which is equivalent to a decimal number of 150. Since the LSB of the original multiplier is 1, the multiplicand 15 must be added to 150 to obtain 165 as the final value of the product.

The present invention method utilizing the technique of right-shifting the lowest bit of the multiplier in order to reduce the memory space required for storing a multiplication table. The memory space saved is exactly half of the original multiplication table. This can be illustrated by an example such as a 4 bits*4 bits multiplication. The magnitude is 16*16. When the multiplier is right-shifted 1 bit, only 3 bits are left. The size of the multiplication table is then 4 bits*3 bits, in other words, 16*8. It is therefore demonstrated that the present invention can save half of the memory space. When the least significant bit (LSB) which has been right-shifted is 1, then the multiplicand is added to the product obtained from the lookup table in order to arrive at the final product. When the lowest bit (LSB) after right-shifting is 0, then only the product value from the lookup table is outputted.

Figure 3:
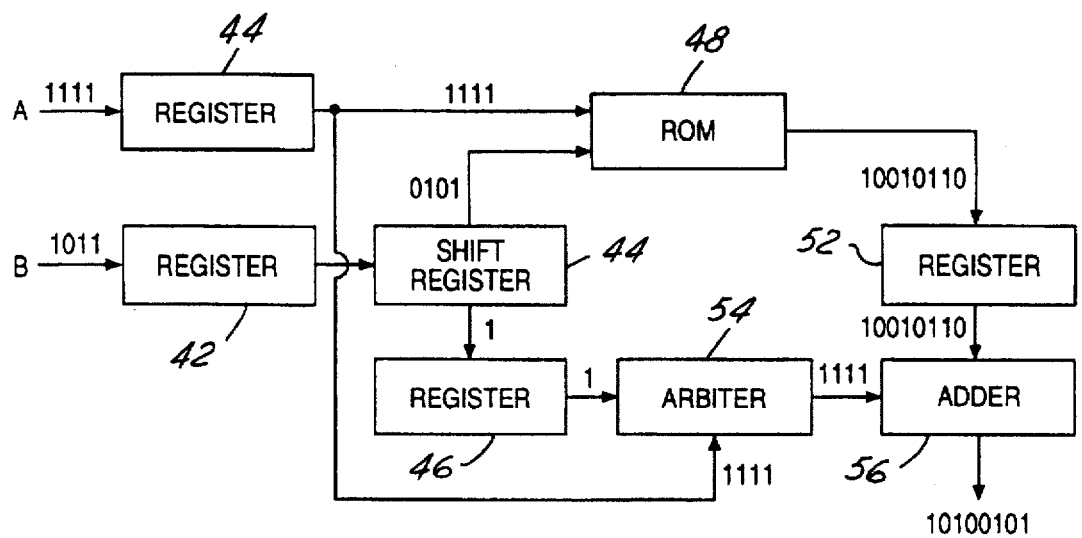
FIG. 3 is an ideal implementation example of the present invention.

FIG. 3 illustrates a functional block diagram for a present invention 4 bits*4 bits implementation example. The multiplicand A15 (1111) is first stored into register 40 and the multiplier B11 (1011) is stored into register 42. Right-shifting the least lowest bit (LSB) of the multiplier B by a shift register 44 to obtain 0101 and then store the shifted lowest bit (LSB) into register 46. An index multiplication table 50 as shown in FIG. 4 is stored into a read-only memory (ROM) 48. As shown in FIG. 4, the stored numbers are expressed in hexadecimal units. The output 1111 from the register 40 and the output 0101 from the shift register 44 are used by the read-only memory 48 as indices for looking up the table to obtain a hexadecimal number 96 (10010110). The 10010110 is stored into a register 52 as the indexed product. When the output from the register 46 is determined to be 1 by the arbiter 54, the multiplicand 1111 stored in the register 40 is outputted to the adder 56 where it is added to the indexed product 10010110. The output product 10100101 which is the decimal number of 165. If the output from the register 46 is determined to be 0 by the arbiter, then 0000 is outputted by the arbiter 54 to the adder in order to be added to the indexed product to become the final product value.

Since the most significant bit (MSB) from the shift register 44 is filled with a 0 after the multiplier B is right-shifted, the most significant bit in the shift register 44 must be 0. As a result, even though a 4 bits*4 bits multiplication device is shown in FIG. 3, the memory space needed for the read-only memory 48 only requires the memory space for a 4 bits*3 bits. The memory space for a 4 bits*3 bits is only half of that for a 4 bits*4 bits.

FIG. 4 shows a 4 bits*3 bits multiplication table. The table is stored in a read-only memory device. The binary numbers stored in the multiplication table is based on the following formula:

$$P=2*(M*N)$$

Wherein M is an integer between 0 and 7 and N is an integer between 0 and 15. P is the product value. The reason that the value of the product is multiplied by 2 is to compensate for the operation of dividing the multiplier by 2 before looking up the table, i.e., the result of shifting 1 bit to the right. The products shown in the multiplication table are expressed in hexadecimal units.

One of the advantages made possible by the present invention is that the memory space required to store a multiplication table is saved by one-half. This is because after shifting to the right by one bit, the multiplier only has three bits left. The multiplication table for a 4 bits*3 bits is 16*8 which represents a magnitude of one-half of the 4 bits*4 bits or 16*16.

The present invention method can be executed by the steps shown in FIG. 5 wherein:

S1: read multiplicand A (X bit) and the multiplier B (Y bit) and storing them in different storage device.

S2: right-shifting the lowest bit (LSB) of the multiplier, and then put 0 in the highest bit (MSB) to obtain the multiplier index B'. The lowest bit (LSB) shifted out is stored in another storage device.

S3: use the multiplicand A and the multiplier index B' as indices to look up the indexed multiplication table. The indexed product value obtained C is stored in a storage device.

S4: determine whether the lowest bit shifted out from the multiplier B is 1, if yes, then execute S5; otherwise execute S6.

S5: adding together the index product value C and the multiplicand A to obtain a product between the multiplicand A and the multiplier B.

S6: adding the index product value C and 0 to obtain C which is the product value of the multiplicand A and the multiplier B.

S7: output the product value.

While the present invention has been described in an illustrative manner, it should be understood that the terminology used is intended to be in a nature of words of description rather than of limitation.

Furthermore, while the present invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

What is claimed is:

1. A method of computing integer multiplication of a binary multiplier and multiplicand by using a combined table lookup and long multiplication method to obtain a product value comprising the steps of:

reading a binary multiplier and multiplicand each having X, Y bits respectively, right-shifting the least significant bit of the multiplier, filling a binary 0 in the leftmost bit of the multiplier to obtain a multiplier index, looking up an indexed multiplication table by said multiplier index and said multiplicand to obtain an indexed product value, and adding said indexed product value to said multiplicand to obtain the final product value when the lowest bit of the multiplier is 1.

2. A method according to claim 1 further comprising a step of adding said index product value and 0 to obtain the final product value when the lowest bit of said multiplier is 0.

3. A method according to claim 1, wherein after reading said binary multiplier and multiplicand, further comprising the step of storing said multiplier and said multiplicand.

4. A method according to claim 1 further comprising the step of storing the multiplier after the right-shifting step.

5. A method according to claim 4 further comprising the step of storing the least significant bit of said multiplier.

6. A method according to claim 1, wherein said multiplication table stores a multiplier index N and a multiplicand index M and an indexed product value P wherein P=2*(M*N).

7. A method according to claim 1, wherein said multiplier and said multiplicand are each a 4 bits binary number.

8. A method according to claim 6, wherein the memory space occupied by said multiplication table is the space required for a 4 bits*3 bits memory space.

9. An apparatus for computing integer multiplication by multiplying a binary Y bit multiplier and a binary X bit multiplicand to obtain a product, said apparatus comprising:

a right-shifting storage device for right-shifting the multiplier by 1 bit and then fill the highest bit with a 0 in order to obtain a multiplier index, a first storage device for storing the lowest bit right-shifted from the multiplier, a second storage device for storing an indexed multiplication table for X bits*(Y−1) bits, and finding the indexed product value from the indexed product table by using said multiplier index and said multiplicand index, and an arbiter for determining whether the lowest bit in the first storage device is 0 or 1, and adding said multiplier and said indexed product value together by an adder and outputting the final product value when said lowest bit is 1.

10. An apparatus according to claim 9, wherein when said arbiter determines said lowest bit is 0, adding said index product value and 0 together by said adder and then outputting said product value.

11. An apparatus according to claim 9 further comprising a third storage device for storing said multiplicand.

12. An apparatus according to claim 9 further comprising a fourth storage device for storing said multiplier.

13. An apparatus according to claim 9, wherein said X bits is 4 bits and said Y bits is 4 bits.

14. An apparatus according to claim 9 wherein said multiplier index N and said multiplicand index M and said indexed product value P satisfiying P=2*(M*N).

* * * * *